United States Patent
Brown et al.

(10) Patent No.: US 9,223,594 B2
(45) Date of Patent: Dec. 29, 2015

(54) PLUG-IN INSTALLER FRAMEWORK

(75) Inventors: Rodney D. Brown, Houston, TX (US);
Andy T. Brennan, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 14/127,810

(22) PCT Filed: Apr. 30, 2012

(86) PCT No.: PCT/US2012/035858
§ 371 (c)(1),
(2), (4) Date: Mar. 25, 2014

(87) PCT Pub. No.: WO2013/006226
PCT Pub. Date: Jan. 10, 2013

(65) Prior Publication Data
US 2014/0223425 A1 Aug. 7, 2014

Related U.S. Application Data (60) Provisional application No. 61/503,992, filed on Jul. 1, 2011.

(51) Int. Cl.
*G06F 9/44* (2006.01)
*G06F 9/445* (2006.01)

(52) U.S. Cl.
CPC .............. *G06F 9/44526* (2013.01); *G06F 8/65* (2013.01)

(58) Field of Classification Search
USPC ........................................................ 717/173
See application file for complete search history.

(56) References Cited

U.S. PATENT DOCUMENTS

| | | |
|---|---|---|
| 5,468,088 A | 11/1995 | Shoemaker et al. |
| 5,708,764 A | 1/1998 | Borrel et al. |
| 5,992,519 A | 11/1999 | Ramakrishnan et al. |
| 6,035,255 A | 3/2000 | Murphy et al. |
| 6,044,328 A | 3/2000 | Murphy et al. |
| 6,070,125 A | 5/2000 | Murphy et al. |
| 6,219,061 B1 | 4/2001 | Lauer et al. |

(Continued)

FOREIGN PATENT DOCUMENTS

| | | |
|---|---|---|
| CA | 2312381 | 6/1999 |
| EP | 1 036 341 | 11/1998 |

(Continued)

OTHER PUBLICATIONS

Dhillon, S. (2008), Managing License Incompatibilities Distributing Eclipse Application Stacks, Thesis, pp. 1-116.

(Continued)

*Primary Examiner* — Marina Lee
(74) *Attorney, Agent, or Firm* — ExxonMobil Upstream Upstream Company, Law Dept.

(57) ABSTRACT

There is provided a system and method for providing a plug-in installer framework. The method includes creating an installer plug-in and reading configuration information with the installer plug-in. An application server may be contacted by the installer plug-in to determine which plug-in files to update in local storage. The updated plug-in files may be downloaded from an application server to local storage, and additional plug-ins may be created within the installer plug-in from the plug-in files in local storage. The additional plug-ins may be loaded through the installer plug-in within a host application.

19 Claims, 4 Drawing Sheets

(56) References Cited

U.S. PATENT DOCUMENTS

| | | |
|---|---|---|
| 6,236,994 B1 | 5/2001 | Swartz et al. |
| 6,353,677 B1 | 3/2002 | Pfister et al. |
| 6,373,489 B1 | 4/2002 | Lu et al. |
| 6,516,274 B2 | 2/2003 | Cheng et al. |
| 6,519,568 B1 | 2/2003 | Harvey et al. |
| 6,549,879 B1 | 4/2003 | Cullick et al. |
| 6,643,656 B2 | 11/2003 | Peterson |
| 6,757,613 B2 | 6/2004 | Chapman et al. |
| 6,765,570 B1 | 7/2004 | Cheung et al. |
| 6,766,254 B1 | 7/2004 | Bradford et al. |
| 6,772,066 B2 | 8/2004 | Cook |
| 6,823,266 B2 | 11/2004 | Czernuszenko et al. |
| 6,826,483 B1 | 11/2004 | Anderson et al. |
| 6,829,570 B1 | 12/2004 | Thambynayagam et al. |
| 6,834,732 B2 | 12/2004 | Haarstad |
| 6,912,467 B2 | 6/2005 | Schuette |
| 6,912,468 B2 | 6/2005 | Marin et al. |
| 6,980,939 B2 | 12/2005 | Dhir et al. |
| 6,980,940 B1 | 12/2005 | Gurpinar et al. |
| 6,993,434 B2 | 1/2006 | Cheng et al. |
| 7,003,439 B2 | 2/2006 | Aldred et al. |
| 7,027,925 B2 | 4/2006 | Terentyev et al. |
| 7,031,842 B1 | 4/2006 | Musat et al. |
| 7,050,953 B2 | 5/2006 | Chiang et al. |
| 7,079,953 B2 | 7/2006 | Thorne et al. |
| 7,096,172 B2 | 8/2006 | Colvin et al. |
| 7,098,908 B2 | 8/2006 | Acosta et al. |
| 7,136,064 B2 | 11/2006 | Zuiderveld |
| 7,181,380 B2 | 2/2007 | Dusterhoft et al. |
| 7,203,342 B2 | 4/2007 | Pedersen |
| 7,248,258 B2 | 7/2007 | Acosta et al. |
| 7,280,932 B2 | 10/2007 | Zoraster et al. |
| 7,281,213 B2 | 10/2007 | Callegari |
| 7,283,941 B2 | 10/2007 | Horowitz et al. |
| 7,298,376 B2 | 11/2007 | Chuter |
| 7,314,588 B2 | 1/2008 | Blankenship |
| 7,330,791 B2 | 2/2008 | Kim et al. |
| 7,337,067 B2 | 2/2008 | Sanstrom |
| 7,362,329 B2 | 4/2008 | Zuiderveld |
| 7,363,866 B2 | 4/2008 | Gnedenko et al. |
| 7,366,616 B2 | 4/2008 | Bennett et al. |
| 7,395,252 B2 | 7/2008 | Anderson et al. |
| 7,409,438 B2 | 8/2008 | McConnell et al. |
| 7,412,363 B2 | 8/2008 | Callegari |
| 7,437,358 B2 | 10/2008 | Arrouye et al. |
| 7,451,066 B2 | 11/2008 | Edwards et al. |
| 7,458,062 B2 | 11/2008 | Coulthard et al. |
| 7,460,957 B2 | 12/2008 | Prange et al. |
| 7,478,024 B2 | 1/2009 | Gurpinar et al. |
| 7,512,543 B2 | 3/2009 | Raghuraman et al. |
| 7,519,976 B2 | 4/2009 | Blevins |
| 7,539,625 B2 | 5/2009 | Klumpen et al. |
| 7,548,873 B2 | 6/2009 | Veeningen et al. |
| 7,565,243 B2 | 7/2009 | Kim et al. |
| 7,576,740 B2 | 8/2009 | Dicken |
| 7,596,481 B2 | 9/2009 | Zamora et al. |
| 7,603,264 B2 | 10/2009 | Zamora et al. |
| 7,606,666 B2 | 10/2009 | Repin et al. |
| 7,616,213 B2 | 11/2009 | Chuter |
| 7,620,534 B2 | 11/2009 | Pita et al. |
| 7,627,430 B2 | 12/2009 | Hawtin |
| 7,630,914 B2 | 12/2009 | Veeningen et al. |
| 7,652,779 B2 | 1/2010 | Wu et al. |
| 7,657,407 B2 | 2/2010 | Logan |
| 7,657,414 B2 | 2/2010 | Zamora et al. |
| 7,668,700 B2 | 2/2010 | Erignac et al. |
| 7,684,929 B2 | 3/2010 | Prange et al. |
| 7,711,550 B1 | 5/2010 | Feinberg et al. |
| 7,716,028 B2 | 5/2010 | Montaron et al. |
| 7,725,302 B2 | 5/2010 | Ayan et al. |
| 7,739,089 B2 | 6/2010 | Gurpinar et al. |
| 7,743,006 B2 | 6/2010 | Woronow et al. |
| 7,796,468 B2 | 9/2010 | Kellogg |
| 7,814,989 B2 | 10/2010 | Nikolakis-Mouchas et al. |
| 7,822,851 B2* | 10/2010 | Hogaboom et al. .......... 709/224 |
| 7,861,243 B2* | 12/2010 | Narayanaswamy et al. ... 717/177 |
| 7,876,705 B2 | 1/2011 | Gurpinar et al. |
| 7,886,285 B2 | 2/2011 | Asselin et al. |
| 7,913,190 B2 | 3/2011 | Grimaud et al. |
| 7,913,246 B2* | 3/2011 | Hammond et al. ........... 717/173 |
| 7,925,483 B2 | 4/2011 | Xia et al. |
| 7,925,695 B2 | 4/2011 | McConnell et al. |
| 7,953,585 B2 | 5/2011 | Gurpinar et al. |
| 7,953,587 B2 | 5/2011 | Bratton et al. |
| 7,970,545 B2 | 6/2011 | Sanstrom |
| 7,986,319 B2 | 7/2011 | Dommisse et al. |
| 7,991,600 B2 | 8/2011 | Callegari |
| 7,995,057 B2 | 8/2011 | Chuter |
| 8,005,658 B2 | 8/2011 | Tilke et al. |
| 8,044,602 B2 | 10/2011 | Smith |
| 8,055,026 B2 | 11/2011 | Pedersen |
| 8,064,684 B2 | 11/2011 | Ratti et al. |
| 8,073,664 B2 | 12/2011 | Schottle et al. |
| 8,094,515 B2 | 1/2012 | Miller et al. |
| 8,103,493 B2 | 1/2012 | Sagert et al. |
| 8,145,464 B2 | 3/2012 | Arnegaard et al. |
| 8,155,942 B2 | 4/2012 | Sarma et al. |
| 8,199,166 B2 | 6/2012 | Repin et al. |
| 8,249,844 B2 | 8/2012 | Dale et al. |
| 8,259,126 B2 | 9/2012 | Chuter |
| 8,280,635 B2 | 10/2012 | Ella et al. |
| 8,296,720 B2* | 10/2012 | Coulthard et al. ........... 717/103 |
| 8,301,426 B2 | 10/2012 | Abasov et al. |
| 8,325,179 B2 | 12/2012 | Murray et al. |
| 8,346,695 B2 | 1/2013 | Pepper et al. |
| 8,364,404 B2 | 1/2013 | Legendre et al. |
| 8,370,906 B2* | 2/2013 | Wen .................... H04L 63/08 717/120 |
| 8,381,815 B2 | 2/2013 | Karanikas et al. |
| 8,427,904 B2 | 4/2013 | Miller et al. |
| 8,560,476 B2 | 10/2013 | Anderson et al. |
| 8,578,000 B2* | 11/2013 | Van Wie et al. ............ 709/220 |
| 8,638,328 B2 | 1/2014 | Lin |
| 8,751,208 B2 | 6/2014 | Brouwer et al. |
| 8,797,319 B2 | 8/2014 | Lin |
| 8,803,878 B2 | 8/2014 | Andersen et al. |
| 2002/0049575 A1 | 4/2002 | Jalali et al. |
| 2002/0177955 A1 | 11/2002 | Jalali et al. |
| 2003/0158919 A1* | 8/2003 | Fomenko .................... 709/220 |
| 2003/0226102 A1* | 12/2003 | Allor .................. G06F 17/3089 715/205 |
| 2004/0012670 A1 | 1/2004 | Zhang |
| 2005/0119959 A1 | 6/2005 | Eder |
| 2005/0120242 A1* | 6/2005 | Mayer et al. ............... 713/201 |
| 2005/0144616 A1* | 6/2005 | Hammond et al. ........... 717/173 |
| 2005/0171700 A1 | 8/2005 | Dean |
| 2006/0224423 A1 | 10/2006 | Sun et al. |
| 2006/0247903 A1 | 11/2006 | Schottle |
| 2006/0265508 A1 | 11/2006 | Angel et al. |
| 2007/0088707 A1 | 4/2007 | Durgin et al. |
| 2007/0199721 A1 | 8/2007 | Givens et al. |
| 2007/0208714 A1 | 9/2007 | Ture et al. |
| 2007/0266082 A1 | 11/2007 | McConnell et al. |
| 2007/0283344 A1* | 12/2007 | Apte et al. ................. 717/174 |
| 2008/0088621 A1 | 4/2008 | Grimaud et al. |
| 2008/0165185 A1 | 7/2008 | Smith et al. |
| 2008/0165186 A1 | 7/2008 | Lin |
| 2008/0215722 A1* | 9/2008 | Hogaboom et al. ......... 709/224 |
| 2008/0306803 A1 | 12/2008 | Vaal et al. |
| 2009/0027380 A1 | 1/2009 | Rajan et al. |
| 2009/0027385 A1 | 1/2009 | Smith |
| 2009/0037114 A1 | 2/2009 | Peng et al. |
| 2009/0125362 A1 | 5/2009 | Reid et al. |
| 2009/0132170 A1 | 5/2009 | Krueger et al. |
| 2009/0157367 A1 | 6/2009 | Meyer et al. |
| 2009/0182541 A1 | 7/2009 | Crick et al. |
| 2009/0222742 A1 | 9/2009 | Pelton et al. |
| 2009/0229819 A1 | 9/2009 | Repin et al. |
| 2009/0240564 A1 | 9/2009 | Boerries et al. |
| 2009/0295792 A1 | 12/2009 | Liu et al. |
| 2009/0299709 A1 | 12/2009 | Liu |
| 2009/0303233 A1 | 12/2009 | Lin et al. |
| 2010/0115432 A1* | 5/2010 | Arthurs et al. ............. 715/760 |
| 2010/0146085 A1* | 6/2010 | Van Wie et al. ............ 709/220 |

(56) References Cited

U.S. PATENT DOCUMENTS

| | | | |
|---|---|---|---|
| 2010/0153968 A1* | 6/2010 | Engel | 719/313 |
| 2010/0191516 A1 | 7/2010 | Benish et al. | |
| 2010/0206559 A1 | 8/2010 | Sequeira, Jr. et al. | |
| 2010/0214870 A1 | 8/2010 | Pepper et al. | |
| 2010/0225642 A1 | 9/2010 | Murray et al. | |
| 2010/0262477 A1* | 10/2010 | Hillerbrand et al. | 705/14.16 |
| 2010/0283788 A1 | 11/2010 | Rothnemer et al. | |
| 2010/0287529 A1* | 11/2010 | Costa et al. | 717/105 |
| 2011/0006881 A1* | 1/2011 | Hogaboom et al. | 340/5.83 |
| 2011/0023092 A1* | 1/2011 | Wen et al. | 726/4 |
| 2011/0029293 A1 | 2/2011 | Petty et al. | |
| 2011/0044532 A1 | 2/2011 | Holl et al. | |
| 2011/0054857 A1 | 3/2011 | Moguchaya | |
| 2011/0060572 A1 | 3/2011 | Brown et al. | |
| 2011/0074766 A1 | 3/2011 | Page et al. | |
| 2011/0099547 A1 | 4/2011 | Banga | |
| 2011/0107246 A1 | 5/2011 | Vik | |
| 2011/0115787 A1 | 5/2011 | Kadlec | |
| 2011/0126192 A1* | 5/2011 | Frost et al. | 717/178 |
| 2011/0153300 A1 | 6/2011 | Holl et al. | |
| 2011/0161133 A1 | 6/2011 | Staveley et al. | |
| 2012/0036496 A1* | 2/2012 | Yang et al. | 717/121 |
| 2012/0150449 A1 | 6/2012 | Dobin | |
| 2012/0166166 A1 | 6/2012 | Czernuszenko | |
| 2013/0111565 A1* | 5/2013 | Wen | H04L 63/08 726/4 |
| 2013/0332511 A1* | 12/2013 | Hala et al. | 709/203 |
| 2013/0332524 A1* | 12/2013 | Fiala et al. | 709/204 |
| 2013/0332917 A1* | 12/2013 | Gaither et al. | 717/170 |
| 2014/0223425 A1* | 8/2014 | Brown et al. | 717/173 |

FOREIGN PATENT DOCUMENTS

| | | |
|---|---|---|
| EP | 1 230 566 | 11/2000 |
| GB | 2448622 | 10/2008 |
| WO | 00/14574 | 3/2000 |
| WO | 03/003053 | 10/2003 |
| WO | 2009/148681 | 12/2009 |
| WO | 2010/067266 | 6/2010 |

OTHER PUBLICATIONS

Bharat, K., et al. (2001), "Who Links to Whom: Mining Linkage Between Web sites", *Proceedings of the 2001 IEE Int'l Conf. on Data Mining*, pp. 51-58.

Cabral, B., et al (1995), "Accelerated Volume Rendering and Tomographic Reconstruction Using Texture Mapping Hardware", *IEEE in Symposium on Volume Visualization*, pp. 91-98, 131.

Crawfis, R., et al. (1992), "Direct Volume Visualization of Three-Dimensional Vector Fields", *Proceedings of the 1992 Workshop on Volume Visualization*, pp. 55-60.

Drebin, R., et al. (1988), "Volume Rendering", *Computer Graphics, the Proceedings of 1988 SIGGRAPH Conference*, vol. 22, No. 4, pp. 65-74.

Lorensen, W., et al., (1987), "Marching Cubes: A High-Resolution 3D Surface Construction Algorithm", *Computer Graphics, The Proceeding of 1987 SIGGRAPH Conference*, vol. 21, No. 4, pp. 163-169.

McCann, P., et al. (2003), "Horizontal Well Path Planning and Correction Using Optimization Techniques, "*J. of Energy Resources Tech*. 123, pp. 187-193.

Mugerin. C., et al. (2002), "Well Design Optimization: Implementation in GOCAD," 22$^{nd}$ Gocade Meeting, Jun. 2002.

Rainaud, J.F., et al. (2004), "WOG—Well Optimization by Geosteering: A Pilot Software for Cooperative Modeling on Internet," *Oil & Gas Science & Tech*. 59(4), pp. 427-445.

Reed, P., et al. (2003) "Simplifying Multiobjective Optimization Using Genetic Algorithms," Proceedings of World Water and Environmental Resources Congress, 10 pgs.

Udoh, E., et al. (2003), "Applications of Strategic Optimization Techniques to Development and Management of Oil and Gas Resources", 27$^{th}$ SPE Meeting, 16 pgs.

\* cited by examiner

PLUG-IN INSTALLER FRAMEWORK

CROSS-REFERENCE TO RELATED APPLICATION

This application is the National Stage entry under 35 U.S.C. 371 of PCT/US2012/035858, that published as Intl. Patent App. Publication No. 2013/006226 and was filed on 30 Apr. 2012, which claims the benefit of U.S. Provisional Application No. 61/503,992, filed on 1 Jul. 2011, each of which is incorporated herein by reference, in its entirety, for all purposes.

FIELD

The present technique relates to a plug-in installer framework. In particular, an embodiment of the present technique relates to a system and method for alleviating the restrictions imposed by plug-in frameworks.

BACKGROUND

This section is intended to introduce various aspects of the art, which may be associated with embodiments of the disclosed techniques. This discussion is believed to assist in providing a framework to facilitate a better understanding of particular aspects of the disclosed techniques. Accordingly, it should be understood that this section is to be read in this light, and not necessarily as admissions of prior art.

The developers of a software application may allow the application to have its functionality enhanced or modified after its original creation. The enhancements or modifications may be realized using a plug-in framework. The additional libraries of a plug-in may be dynamically loaded into memory at runtime by the executable application or one of its dependent libraries. Once loaded into memory, the plug-ins may interact with the software application via a series of predefined interfaces provided by the software application, also known as an Application Programming Interface (API). Software applications that provide a plug-in capability may also provide a mechanism whereby plug-in libraries added to the software application subsequent to its original creation can be discovered. Discovering a plug-in library may entail some type of configuration whereby the executable file, or one of its dependent libraries, can read the location of additional plug-in libraries and dynamically load those libraries into memory.

Because plug-in frameworks can be implemented using many different methods, often there are restrictions that place constraints on third parties wishing to implement a plug-in. These restrictions may be problematic in managed computing environments, such as large corporate computing environments, where an end user's ability to make updates to a local computing system is limited. Instead, a member of an Information Technology (IT) staff with elevated privileges manually installs plug-ins onto end users' workstations. This solution may become time-consuming and cost-prohibitive if the number of users is large, if the user base is geographically dispersed, or if there are frequent updates to the plug-ins to be installed. Moreover, this solution can lead to further issues if the configuration information for multiple plug-ins is commingled in a single configuration location, such as a single configuration file. In such cases, the updates to plug-in configuration can carry additional risk of corrupting other plug-ins or the host application itself. Another solution may include redeploying the entire host software application along with its associated plug-ins each time a plug-in is added or updated in the environment. While redeployment may help alleviate some of the potential corruption issues, it does not overcome the issues of large disperse user groups and frequent updates. It may also carry the additional burden of requiring extensive retesting of the host application whenever a plug-in update is performed.

U.S. Pat. No. 7,458,062 by Coulthard, et al. (hereinafter "Coulthard"), discloses a framework for accessing a remote system from an integrated development environment. A connection registry contains objects and subsystem objects, and the connection objects have attribute information for the remote system whereas the subsystem objects contain information specific to a particular tool and connection. Additionally, the framework may include a common user interface by which tools can be registered within a connection, or by which a new connection can be created. The framework may maintain connections and tools within an integrated development environment independent of the type of operating system used by the remote systems and the programming language of the tools.

The previously described methods may not function in the absence of a networked environment. Further, these methods may allow use of plug-ins only when the plug-in meets a particular privilege level. Additionally, these methods may not allow a user to select particular plug-ins.

SUMMARY

An embodiment of the present techniques provides a method for a plug-in installer framework. An installer plug-in may be created, and configuration information may be read with the installer plug-in. An application server may be contacted by the installer plug-in to determine which plug-in files to update in local storage. The updated plug-in files may be downloaded from an application server to local storage, and additional plug-ins may be created within the installer plug-in from the plug-in files in local storage. The additional plug-ins may be loaded through the installer plug-in within a host application.

Another embodiment of the present techniques provides a system for a plug-in installer framework, including a processor, an installer plug-in module, and a tangible, machine-readable storage medium. The system may read configuration information with the installer plug-in module and contact an application server with the installer plug-in module to determine which plug-in files to update in local storage. The system may also download updated plug-in files from an application server to local storage, create additional plug-ins within the installer plug-in from the plug-in files in local storage, and load the additional plug-ins through the installer plug-in module in a host application.

Another embodiment of the present techniques provides a non-transitory, computer readable medium comprising code configured to direct a processor to provide a plug-in installer framework. An installer plug-in may be created, and configuration information may be read with the installer plug-in. An application server can be contacted with the installer plug-in to determine which plug-in files to update in local storage, and updated plug-in files may be downloaded from an application server to local storage. Additional plug-ins may be created within the installer plug-in from the plug-in files in local storage and loaded through the installer plug-in in a host application.

DESCRIPTION OF THE DRAWINGS

Advantages of the present techniques may become apparent upon reviewing the following detailed description and drawings of non-limiting examples of embodiments in which.

DETAILED DESCRIPTION

In the following detailed description section, specific embodiments are described as examples. However, to the extent that the following description is specific to a particular embodiment or a particular use, this is intended to be for exemplary purposes only and simply provides a description of the exemplary embodiments. Accordingly, the present techniques are not limited to embodiments described herein, but rather, it includes all alternatives, modifications, and equivalents falling within the spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

The term "Application Programming Interface (API)" refers to a series of predefined interfaces provided by a software application. An API can be used to provide a particular set of rules and specifications that allow software programs to communicate with each other.

The term "computer component" refers to a computer-related entity, hardware, firmware, software, a combination thereof, or software in execution. For example, a computer component can be, but is not limited to being, a process running on a processor, a processor, an object, an executable, a thread of execution, a program, and a computer. One or more computer components can reside within a process or thread of execution and a computer component can be localized on one computer or distributed between two or more computers.

The term "dynamic loading" refers to the runtime loading of library files.

The term "executable" refers to a group of executable instructions stored in a file.

The term "file" refers to a block of arbitrary information, or resource for storing information such as executable instructions.

The term "library file" or "library" refers to a collection of executable instructions encompassing a portion of the overall software application.

The terms "non-transitory, computer-readable medium", "tangible machine-readable medium" or the like refer to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, DVD-ROM, a holographic memory, or any other optical medium, a RAM, a PROM, and EPROM, a FLASH-EPROM, a solid state medium like a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible storage medium or tangible distribution medium and prior art-recognized equivalents and successor media, in which the software implementations embodying the present techniques are stored.

The term "plug-in" may refer to a set of software components that adds specific abilities to a larger software application and may allow customizing the functionality of the application.

The term "root directory" may refer to the top-most files in a hierarchy of files.

The term "software" includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one skilled in the art that computer-readable and/or executable instructions can be located in one logic and/or distributed between two or more communicating, co-operating, and/or parallel processing logics and thus can be loaded or executed in serial, parallel, massively parallel, and other manners.

The term "system" refers to any computer information or control device, computing device, devices or network of devices, of hardware or software, comprising processor means, data storage means, program means, or user interface means. For example, a system can refer to a phone, tablet, or any other computing device.

Overview

An embodiment provides a method of providing a plug-in framework, and may provide a system capable of alleviating the restrictions imposed by plug-in frameworks. The system may function when end users do not have the ability to install software, as is the case with managed computing systems. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

Figure 1:
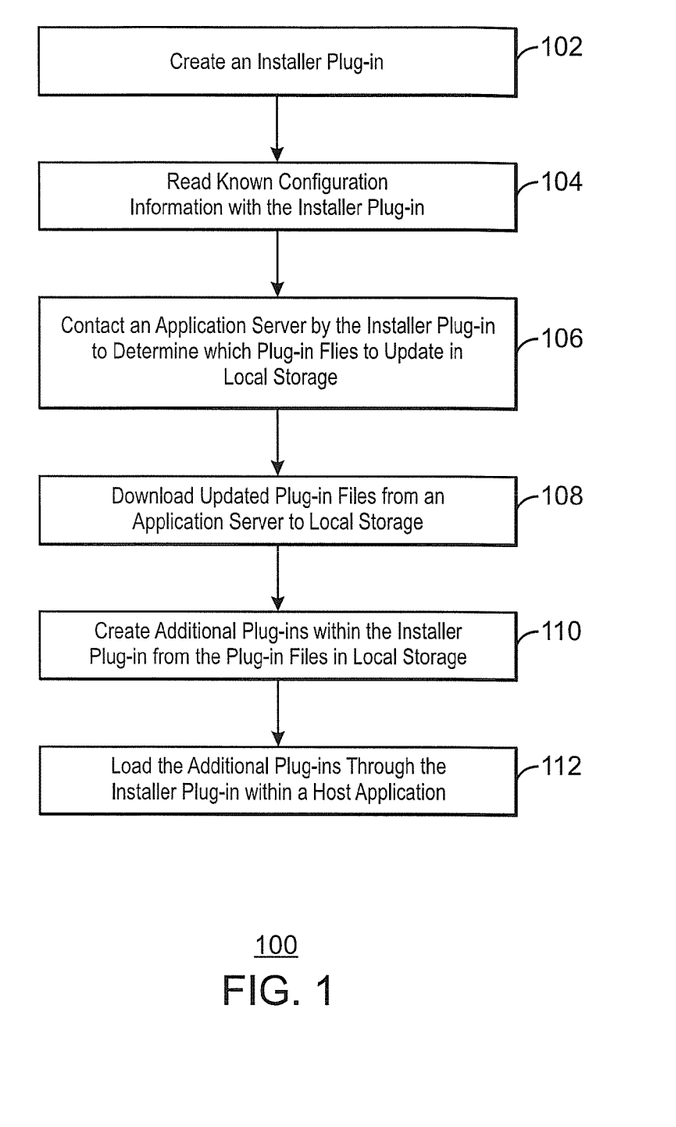
FIG. 1 is a process flow diagram summarizing a method of providing a plug-in installer framework according to an embodiment of the present techniques.

FIG. 1 is a process flow diagram summarizing a method 100 of providing a plug-in installer framework according to an embodiment of the present techniques. At block 102, an installer plug-in is created. The installer plug-in may be created by the host application. At block 104, the installer plug-in may read configuration information. The configuration information may define the additional plug-ins that will be loaded into the host application and where additional plug-ins are located on the application server. Additionally, the configuration information may be determined by an end user, or the information may be pre-determined.

At block 106, the installer plug-in may contact the application server to determine which plug-in files should be updated in local storage. A file may be updated in local storage if the plug-in files on the application server have been changed. At block 108, updated plug-in files are downloaded to local storage, which can be any location on the end user's machine that does not require elevated privileges. At block 110, the installer plug-in creates each of the additional plug-ins. The installer plug-in may keep each additional plug-in in its internal collection, allowing each of those plug-ins the chance to add its functionality to the host application whenever the installer plug-in is called. Further, the plug-in files, including files for the installer plug-in and the additional plug-ins, may remain on local storage after the execution of the plug-ins is terminated. At block 112, additional plug-ins may be loaded through the installer plug-in within a host application. In this manner, the additional plug-ins function seamlessly within the host application.

Figure 2:
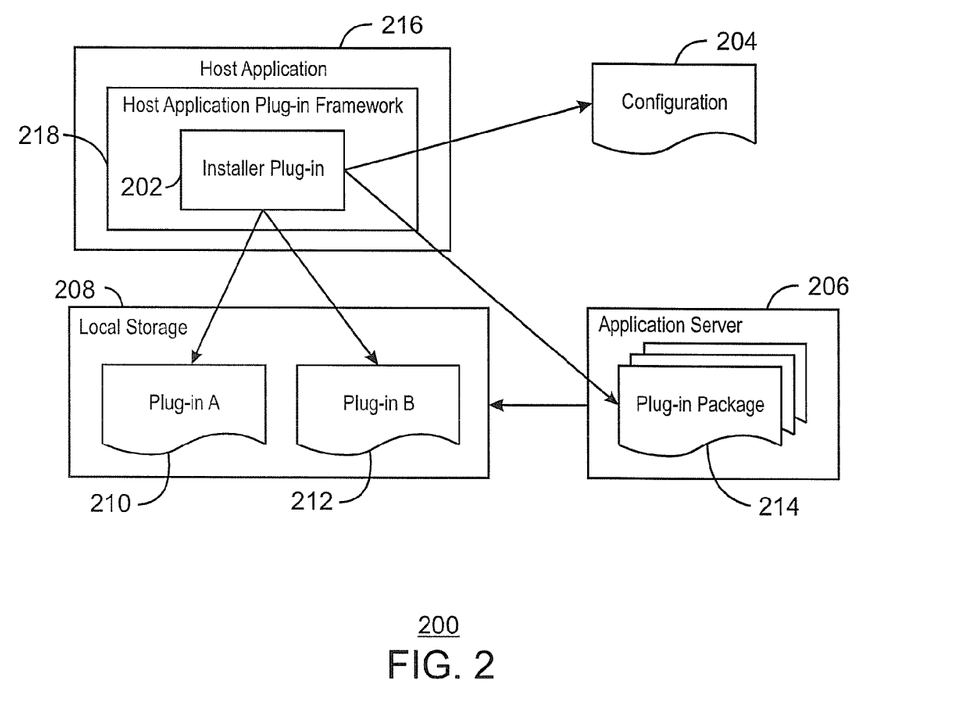
FIG. 2 is a diagram illustrating a plug-in installer framework according to an embodiment of the present techniques.

FIG. 2 is a diagram illustrating a plug-in installer framework 200 according to an embodiment of the present techniques. The system 200 includes the installer plug-in 202, configuration information 204 in a known location, an application server 206, and local storage 208. The known location of the configuration information 204 could be a file on a network or a web site. Further, the application server could be a network file system or a web server. Local storage 208 contains plug-in A 210 and plug-in B 212. The application server 206 contains a plug-in package 214.

The installer plug-in 202 conforms to the host application's 216 defined application programming interface (API) and may be installed as prescribed by the host application. The host application plug-in framework 218 may define methods such as Initialize( ), Register( ), and Dispose( ). As the name suggests, Initialize( ) may create a plug-in module. Register( ) may allow the plug-in module to add its functionality to the host application, while Dispose( ) may release the resources used by the plug-in module. At runtime, the host application 216 may first create the installer plug-in and call Initialize( ) on the installer plug-in.

The installer plug-in 202 may read the known configuration information 204. The configuration information 204 may define the additional plug-ins that will be loaded into the host application 216 and where those additional plug-ins are located on the application server 206. Moreover, the installer plug-in 202 may contact the application server 206 to determine which files need to be updated in local storage 208. For example, if a change has occurred to the files for plug-in A 210 in the plug-in package 214, then the files for plug-in A 210 may need to be updated. Similarly, if the files for a particular plug-in do not exist on local storage 208, then the files should be loaded from the plug-in package 214 to local storage 208. As discussed herein, if the application server is not available, the plug-in files previously loaded to local storage will be available for use.

Updated files from the plug-in package 214 may be downloaded to local storage 208, which can be any location on the end user's computer that does not require elevated privileges. For example, on a Windows-based machine, this location could be a user-specific folder in a local profile. On a Linux-based machine, this location could be a folder in the user's home directory. The installer plug-in may load and create each of the additional plug-ins with the plug-in files downloaded from the plug-in package 214. The installer plug-in 202 maintains an internal collection of the additional plug-ins and is responsible for all interaction between the additional plug-ins and the host application, which is unaware of the additional plug-in libraries. For ease of description, only two additional plug-ins are described, however, the present techniques may be used with many more additional plug-ins.

When the host application 216 calls the Register( ) method on the installer plug-in 202, it will forward the request on to each of the additional plug-ins plug-in A 210 and plug-in B 212 in its internal collection. Each of additional plug-in A 210 and additional plug-in B 212 may add its functionality to the host application 216 through the installer plug-in 202. To the end-user of the host application 216, additional plug-in A 210 and additional plug-in B 212 function normally, as if they had been installed and configured directly by the host application 216. When the host application 216 is terminated, it may call Dispose( ) on the installer plug-in 202, which will then forward the Dispose( ) call to each additional plug-in A 210 and additional plug-in B 212 in its collection, and then remove all entries from that collection.

Figure 3:
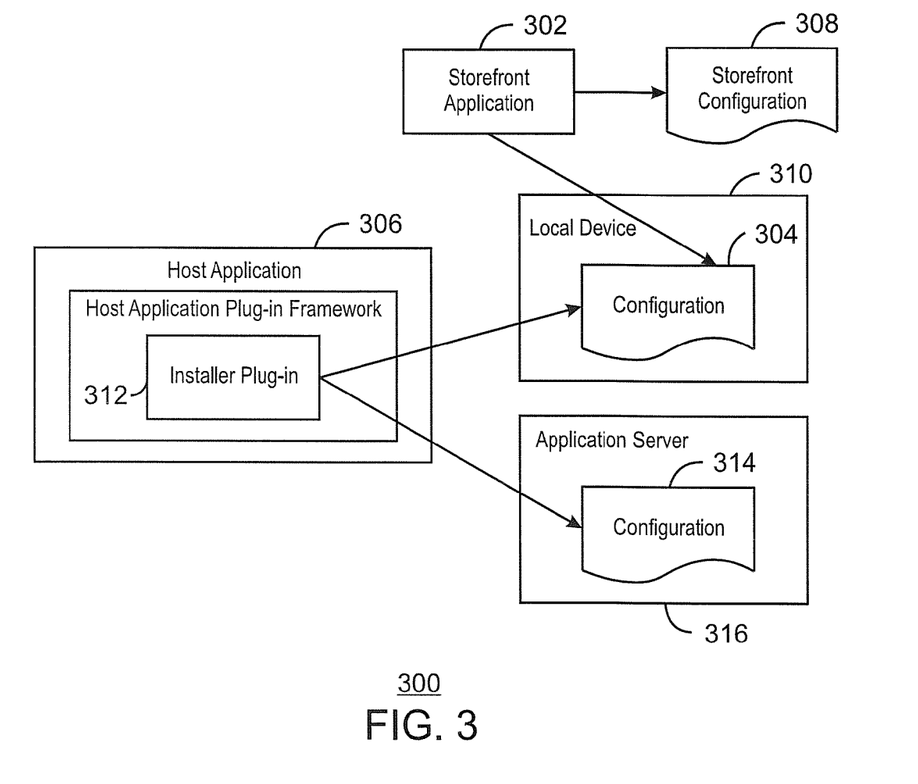
FIG. 3 is a diagram illustrating a plug-in installer framework and a storefront application according to an embodiment of the present techniques.

FIG. 3 is a diagram illustrating a plug-in installer framework and a storefront application according to an embodiment of the present techniques. A store front application 302 may read configuration information 304 pertaining to all available plug-ins and present the list of available plug-ins to a user. Through the storefront application 302, the user may examine the list of available plug-ins and select which subset of plug-ins is desirable for their particular use of the host application 306. The storefront application 302 may populate its list of available plug-ins by examining the storefront configuration information 308 stored in a central location. Upon selecting a subset of plug-ins, the storefront application 302 may update the user's specific configuration information 304 stored on the local device 310 with the set of plug-ins selected. At the next execution of the host application 306, the installer plug-in 312 may read the updated local configuration information 304, download the plug-in files related to the additional plug-ins defined with the configuration information 304, and begin the techniques described in FIG. 2 to enable additional plug-ins within the host application 306.

The user may be able to use the storefront application 302 to remove additional plug-ins that have been previously had installed. When the user removes an additional plug-in using the storefront application 302, the storefront application 302 may update the local configuration information 304 to remove all references to the removed plug-in. The storefront application 302 may then delete the plug-in files associated with those particular plug-ins from the local storage. On subsequent launch of the host application 306, the installer plug-in 312, finding no reference to the previously used additional plug-ins in the configuration information 304, may not invoke those particular plug-ins as part of the host application 306.

The present techniques may automatically download and install plug-in updates each time the host application is executed by the user. In such a scenario, the application server may hold configuration information for each of the plug-ins which lists the files required for that plug-in and the versions of those files. Similarly, the configuration information on the local store may hold this same information for the previous version of downloaded plug-ins. After launch of the host application and creation of the installer plug-in, the installer plug-in may compare the copy of the plug-in configuration information in local storage with the current copy on the application server for each desired additional plug-in. By performing a comparison of the list of files and their versions, the installer plug-in can determine which files have been updated on the application server and download only those specific updated files to the local storage prior to loading the plug-ins. In this manner, the user of the software application may receive automatic version updates to plug-ins each time the host application is launched. As a result, IT staff may be involved in merely updating of plug-in files on the application server while not performing any action on the end user's system.

When particular plug-ins are required, the user may still have the ability to select which plug-ins they desire to have installed within their local copy of the host software application. For a variety of reasons, IT staff may want some plug-ins to be required. Accordingly, those required plug-ins may not be able to be uninstalled by the end user. Referring again to FIG. 3, in such an implementation of required plug-ins, the application server configuration 314 may include a list of required plug-ins. This list may be maintained on the application server 316 by IT staff. Upon execution of the host application 306, the installer plug-in 312 may read the list of required plug-ins from the application server configuration 314, and copy that configuration into the local device 310 configuration information 304. The host application 306 may then download and execute the required plug-ins in the same manner that it downloaded and executed the user-selected plug-ins. The required plug-ins may not appear in the storefront configuration information 308, as required plug-ins could neither be added nor removed by the user. Rather, the required plug-in configuration 314 may appear on the application server 316.

The present techniques may allow software applications to continue to use plug-ins installed by the installer plug-in in situations where the local system on which the host software application is running is not connected to a network capable of reaching the application server. In such a scenario, the local system is connected to the application server using a network when the user wishes to change the list of desired plug-ins. However, after an initial update to the list of available plug-ins, such a network connection may not be required. When the host software application invokes the installer plug-in, the installer plug-in may determine whether the application server was reachable by the network. If the application server is available, the installer plug-in can proceed with checking for plug-in updates as described herein. If the application server is not available, the installer plug-in may skip updating the plug-ins and proceed to launch the installed plug-ins available on the local system. The installer plug-in may perform these steps on each launch of the host software application and automatic updates to each plug-in may occur whenever the application server is available, however updates can be skipped when the application server is not available. In this manner, use of plug-ins in a disconnected state may be efficiently provided.

By allowing IT staff to manage files and configurations on a centralized application and storefront servers and not manually updating the local system installations of the host application, the techniques described herein may greatly reduce the time and effort required by IT staff. Further, the present techniques may reduce the burden placed upon the end user. They receive automatic updates to their plug-ins and the ability to self-service the installation of new plug-ins and uninstall plug-ins they no longer need.

EXAMPLES

An example of an implementation of the present techniques is an installer plug-in built for reservoir simulation. Reservoir simulation may be accomplished through various host applications, including Windows-based .NET applications for use by geoscientists in the oil and gas industry. Such applications typically have a plug-in based architecture along with an API through which plug-ins may provide a variety of functionality and extension points to the host application.

A host application may require a plug-in to implement the APIModule interface shown in the code below.

```
public interface APIModule : IDisposable
{
    void Initialize( );
    void Incorporate( );
    void IncorporatePresentation( );
    void Terminate( );
}
```

The methods in the APIModule interface may be called in the order shown in the sample code above. Once the plug-in implements the APIModule interface it may be installed into the host application by copying all the files required by the plug-in into a sub-directory of host application's installation directory. A file such as host.exe.config file, an XML file located in the host application installation directory, may be modified to include the new plug-in. Installing files into a sub-directory of the host application and modifying a configuration file shared by all installed plug-ins, as well as the host application itself, causes adding plug-in functionality to some host applications to be time-consuming and cost-prohibitive.

In an example implementation of the present techniques, a PluginInstaller implementation of the APIModule interface is created. This PluginInstaller implementation may be installed into the host application using the host application plug-in installation method described herein. When the host application calls the Initialize( ) method on the PluginInstaller, the PluginInstaller may first copy a list of required plug-ins from an XML configuration file located on the application server to the local configuration directory defined by: Environment.GetFolderPath(Environment.SpecialFolder.LocalApplicationData)

The PluginInstaller may load all of the configuration information for both the user-defined and required plug-ins into memory. Next, the PluginInstaller may download any updates to the user-defined or required plug-ins that have occurred since the last download. The PluginInstaller may iterate through the list of plug-ins to be initialized and load them into memory. Additionally, the PluginInstaller can take the path to the root library, called an assembly in .NET, and loads that assembly into memory. By adding the path to the assembly to the codebase of the assembly name, it enables the normal .NET assembly loading process to find and load any additional libraries required by the plug-in, provided they are installed in the same directory as the root assembly.

Once loaded into memory, an instance of the concrete implementation of the APIModule interface for that plug-in is created and returned, as shown by the code below.

```
private APIModule CreateModule(string assemblyPath)
{
    // load in a reflection-only context to get the assembly's full name
    Assembly a = Assembly.ReflectionOnlyLoadFrom(assemblyPath);
    AssemblyName name = new AssemblyName(a.FullName);
    name.CodeBase = String.Format("file:///{0}", assemblyPath);
    // load the assembly into the default context using the fully qualified name
```

-continued

```
    Assembly assembly = Assembly.Load(name);
    // instantiate the module
    APIModule module = assembly.CreateInstance(this.ModuleName) as
    APIModule;
    return module;
}
```

The PluginInstaller may then call the Inititalize( ) method on each of the loaded plug-ins. When Initialize( ) is called on each of the plug-ins, they perform their normal initialization routine, which may include interaction with the host application API. The plug-ins may interact with the host application API directly, and the plug-ins have no knowledge of the PluginInstaller. Further, the plug-ins do not have to be written specifically for the PluginInstaller. The PluginInstaller may call the API method Initialize( ) on the plug-ins, and at that point, the plug-ins have access to all services or modules that are made available by the host application. Similarly, the PluginInstaller may call Incorporate( ) and IncorporatePresentation( ) on each of the plug-ins. The plug-ins may then perform individual Incorporate and IncorporatePresentation routines that may include interaction with the host application API.

After Incorporate( ) and IncorporatePresentation( ) have been called on each of the plug-ins, the plug-ins are installed into the host application and function normally. However, they are installed outside of the host application's application directory and perform no modification to the host.exe.config XML file. When the host application is closed, the PluginInstaller can call Terminate( ) on each of the plug-ins. The APIModule interface itself implements IDisposable from the .NET framework. This interface provides a Dispose( ) method for performing final cleanup. When the host application calls Dispose( ) on the PluginInstaller, the PluginInstaller may iterate through the plug-ins in its internal collection and call the Dispose( ) method of each plug-in.

System

Figure 4:
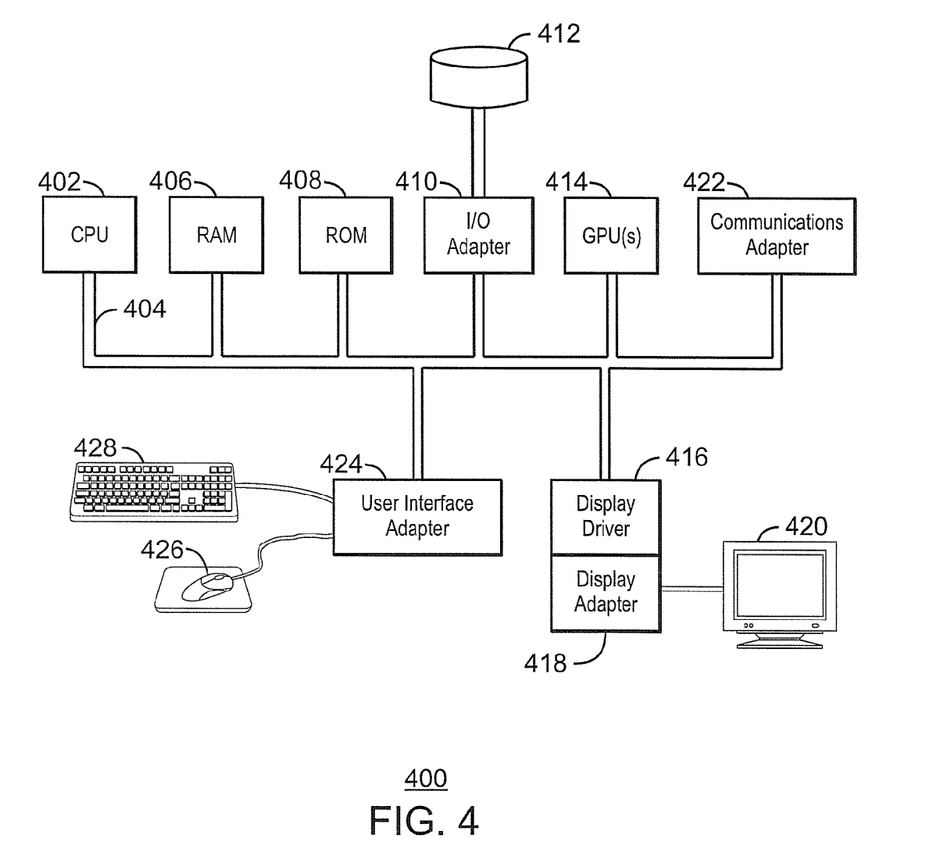
FIG. 4 is a block diagram of a computer system that may be used to optimize matrix and vector calculations according to an embodiment of the present techniques.

FIG. 4 is a block diagram of a computer system 400 that may be used to provide a plug-in installer framework according to an embodiment of the present techniques. A central processing unit (CPU) 402 is coupled to system bus 404. The CPU 402 may be any general-purpose CPU, although other types of architectures of CPU 402 (or other components of exemplary system 400) may be used as long as CPU 402 (and other components of system 400) supports the operations as described herein. Those of ordinary skill in the art will appreciate that, while only a single CPU 402 is shown in FIG. 4, additional CPUs may be present. Moreover, the computer system 400 may comprise a networked, multi-processor computer system that may include a hybrid parallel CPU/GPU system. The CPU 402 may execute the various logical instructions according to various embodiments. For example, the CPU 402 may execute machine-level instructions for performing processing according to the operational flow described above in conjunction with FIG. 1.

The computer system 400 may also include computer components such as non-transitory, computer-readable media. Examples of computer-readable media include a random access memory (RAM) 406, which may be SRAM, DRAM, SDRAM, or the like. The computer system 400 may also include additional non-transitory, computer-readable media such as a read-only memory (ROM) 408, which may be PROM, EPROM, EEPROM, or the like. RAM 406 and ROM 408 hold user and system data and programs, as is known in the art. The computer system 400 may also include an input/output (I/O) adapter 410, a communications adapter 422, a user interface adapter 424, and a display adapter 418.

The I/O adapter 410 may connect additional non-transitory, computer-readable media such as a storage device(s) 412, including, for example, a hard drive, a compact disc (CD) drive, a floppy disk drive, a tape drive, and the like to computer system 400. The storage device(s) may be used when RAM 406 is insufficient for the memory requirements associated with storing data for operations of embodiments of the present techniques. The data storage of the computer system 400 may be used for storing information and/or other data used or generated as disclosed herein. For example, storage device(s) 412 may be used to store configuration information or additional plug-ins in accordance with an embodiment of the present techniques. Further, user interface adapter 424 couples user input devices, such as a keyboard 428, a pointing device 426 and/or output devices to the computer system 400. The display adapter 418 is driven by the CPU 402 to control the display on a display device 420 to, for example, present information to the user regarding available plug-ins.

The architecture of system 400 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments. In an embodiment, input data to the computer system 400 may include various plug-ins and library files. Input data may additionally include configuration information.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. A method of providing a plug-in installer framework, comprising:
    creating an installer plug-in conforming to a host application's defined Application Programming Interface (API);
    reading configuration information with the installer plug-in;
    contacting an application server with the installer plug-in to determine which plug-in files to update in local storage;
    downloading updated plug-in files from an application server to local storage;
    updating the plug-in files which are used to create additional plug-ins;
    loading each of the additional plug-ins in an internal collection of the installer plug-in;
    maintaining the internal collection of the additional plug-ins in an additional plug-in library of the installer plug-in, wherein the host application is unaware of the additional plug-in library; and
    loading the additional plug-ins through the installer plug-in when a functionality of at least one of the additional plug-ins is called, wherein the host application is unaware of the additional plug-ins.

2. The method recited in claim 1, wherein the configuration information defines the additional plug-ins that will be loaded into the installer plug-in.

3. The method recited in claim 1, wherein the configuration information defines where the additional plug-ins are located on the application server.

4. The method recited in claim 1, wherein the configuration information is pre-determined.

5. The method recited in claim 1, wherein the configuration information is determined by an end user.

6. The method recited in claim 1, comprising using a storefront application to allow a user to select additional plug-ins from available plug-ins to be created using the installer plug-in.

7. The method recited in claim 1, wherein the local storage is anywhere that does not require elevated privileges on an end user computer.

8. The method recited in claim 1, wherein updated plug-in files are automatically downloaded and used to create the additional plug-ins.

9. A system that is adapted to provide a plug-in installer framework, the system comprising:
a processor;
a tangible, machine-readable storage medium that stores machine-readable instructions for execution by the processor, the machine-readable instructions comprising:
code that, when executed by the processor, is adapted to cause the processor to read configuration information with an installer plug-in module conforming to a host application's defined Application Programming Interface (API);
code that, when executed by the processor, is adapted to cause the processor to contact an application server with the installer plug-in module to determine which plug-in files to update in a local storage;
code that, when executed by the processor, is adapted to cause the processor to download updated plug-in files from an application server to the local storage;
code that, when executed by the processor, is adapted to cause the processor to create the additional plug-ins within the installer plug-in module from the plug-in files in local storage;
code that, when executed by the processor, is adapted to cause the processor to install the additional plug-ins outside of the host application's application directory, wherein the host application is unaware of the additional plug-ins; and
code that, when executed by the processor, is adapted to cause the processor to load the additional plug-ins through the installer plug-in module in the host application when a functionality of at least one of the additional plug-ins is called.

10. The system recited in claim 9, wherein the configuration information defines the additional plug-ins that will be loaded into the installer plug-in module.

11. The system recited in claim 9, wherein the configuration information defines where the additional plug-ins are located on the application server.

12. The system recited in claim 9, wherein the configuration information is pre-determined.

13. The system recited in claim 9, wherein the configuration information is determined by an end user.

14. The system recited in claim 9, comprising using a storefront application to allow a user to select additional plug-ins from available plug-ins to be created using the installer plug-in module.

15. The system recited in claim 9, wherein the local storage is anywhere that does not require elevated privileges on an end user computer.

16. The system recited in claim 9, wherein updated plug-in files are automatically downloaded and used to create the additional plug-ins.

17. A non-transitory, computer readable medium comprising code configured to direct a processor to:
create an installer plug-in conforming to a host application's defined Application Programming Interface (API);
read configuration information with the installer plug-in;
contact an application server with the installer plug-in to determine which plug-in files to update in a local storage;
download updated plug-in files from an application server to the local storage, wherein the updated plug-in file is used to create additional plug-ins;
load one or more additional plug-ins in an internal collection of the installer plug-in;
maintain the internal collection of the additional plug-ins in an additional plug-in library of the installer plug-in, wherein the host application is unaware of the additional plug-in library;
install the additional plug-ins outside of host application's application directory; and
load the additional plug-ins through the installer plug-in when a functionality of at least one of the additional plug-ins is called, wherein the host application is unaware of the additional plug-ins.

18. The non-transitory, computer readable medium recited in claim 17, comprising using a storefront application to allow a user to select the additional plug-ins from available plug-ins to be created using the installer plug-in.

19. The non-transitory, computer readable medium recited in claim 17, wherein the local storage is anywhere that does not require elevated privileges on an end user computer.

* * * * *